July 24, 1962 J. H. APELBAUM ETAL 3,045,320
IMPREGNATED CATHODES
Filed March 12, 1959
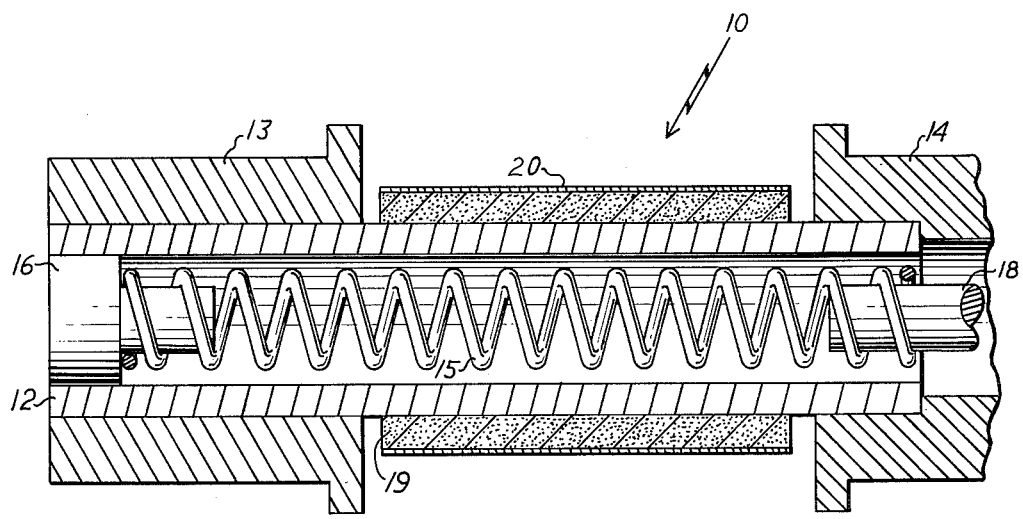
INVENTORS
JOSEPH H. APELBAUM
WILLIAM J. O'BRIEN
BY N. Vincent Haroda
ATTORNEY

3,045,320
IMPREGNATED CATHODES
Joseph H. Apelbaum, Waban, Mass., and William J. O'Brien, West Los Angeles, Calif., assignors to Raytheon Company, a corporation of Delaware
Filed Mar. 12, 1959, Ser. No. 799,027
7 Claims. (Cl. 29—25.18)

This invention relates to a method of fabricating impregnated cathodes, and more particularly, relates to an improved method of machining cathodes having a porous tungsten matrix which is impregnated with thorium metal.

Impregnated cathodes have been used in magnetrons which consist of a porous body of tungsten or refractory material whose pores are impregnated with an electron-emissive material, such as thorium. Such cathodes are characterized by a relatively high degree of freedom from arcing between anode and cathode, relatively high emission and long cathode life.

One of the methods used in fabricating such impregnated cathodes has been to impregnate the porous tungsten body with a filler material, such as copper, which acts as a lubricant to facilitate machining of the tungsten body. This prior method is time consuming and costly, since the filler material not only must be introduced into the pores of the tungsten body, but, after machining has been accomplished, must be removed from the tungsten body, as by firing in a vacuum, before impregnation with the electron-emissive material can take place. As is well known, the size of the magnetron cathode should be held within close limits, so that electrons are release to the space charge at a point where the radio frequency field conditions are proper for efficient functioning of the space charge. During the firing, following the machining step necessary for the removal of the filler material from the pores of the tungsten body, the cathode body undergoes shrinkage. Consequently, the machined cathode may no longer have the dimensions and configuration required for proper operation in a magnetron. A variation in the diameter of the cathode body will alter the magnetron cathode-to-anode distance and may affect the magnetron mode spectrum. A change in the inner diameter of the cathode body may result in uneven heating of the cathode surface by the heater coil, as well as making it difficult to suitably mount the cathode body to a refractory supporting member. For these reasons, therefore, it is preferable that any shrinkage accompanying firing of the cathode body occur before machining the cathode. Finally, if the filler material used in prior methods of cathode machining is not completely removed from the pores of the tungsten body, the emission characteristics of the cathode will be adversely affected.

Tungsten is a very hard substance which can be machined only with great difficulty. Tools, such as carbide tools which are capable of machining a tungsten cathode body, wear out very rapidly and must be replaced frequently, often during the machining of a single cathode.

In accordance with the invention, the tungsten compact is fired at a high temperature and for the necessary time to give it sufficient strength and the desired porosity. Thorium is next applied to the surface of the tungsten compact, preferably after first cooling the compact to a temperature which permits ready handling and to a temperature below that at which oxidation of the tungsten occurs. The tungsten compact becomes impregnated with thorium when heated to a temperature above the melting point of the thorium. The thorium, in addition to being a filler of the tungsten body, which becomes dispersed substantially uniformly throughout the porous mass of the tungsten body, acts as a lubricant which allows the impregnated tungsten body to be readily machined to the desired size and shape and with less wear on tool bits. Moreover, the machining will be uniform throughout the extent of the cathode body. Furthermore, no further change in size or shape of the cathode follows the machining, since there is no need for subsequent firing to remove undesired filler material. An obvious saving in time and cost is achieved, as contrasted with the prior method of machining impregnated cathodes, since the steps of first impergnating with a filler material and then firing with the filler material after machining are eliminated.

A single FIGURE of the drawing shows in cross section one form of cathode assembly embodying the present invention.

The cathode assembly 10 includes a metal supporting sleeve 12 which preferably is made of a refractory metal, such as molybdenum or tungsten, capable of withstanding relatively high cathode operating temperatures incident to impregnated cathodes of the type herein described. End shield members 13 and 14 may be attached to the supporting sleeve 12 adjacent both ends of the sleeve to prevent emission of the cathode material in a direction parallel to the longitudinal axis of the cathode assembly. An elongated heater coil 15 is included within the central bore in supporting sleeve 12. One end of the heater coil 15 may be attached to the reduced portion of an electrically conductive member 16 which, in turn, is secured to the inner periphery of the supporting sleeve 12 at one end thereof. The other end of the heater 15 is attached to a heater lead-in conductor 18 which passes through the central aperture in the end shield member 14 and thence external to the evacuated envelope of the electron discharge device, not shown, in which the cathode assembly 10 is to be mounted. For a description of a typical magnetron electron discharge device in which a cathode according to this invention may be incorporated, attention is directed to United States Patent No. 2,542,908 of P.P. Derby, issued February 20, 1951. The electron-emissive portion of the cathode assembly 10 includes a tubular cathode body 19 of porous tungsten whose surface, during magnetron operation, is uniformly coated with a very thin layer 20 of thorium metal. In practice, this layer is slightly less than one molecular layer in thickness and is greatly exaggerated in the drawing, for the sake of clarity.

A mass of tungsten powder is compressed in a mold to produce a tungsten compact which conforms generally to the desired shaped and size of the finished cathode body. The tungsten compact should be somewhat oversize, since subsequent firing steps, to be described later, cause shrinkage of the tungsten compact. In one instance, the tungsten powder was subjected to a pressure of fourteen tons per square inch. The pressure will depend partly upon the size of the tungsten particles and the desired porosity of the tungsten compact.

The tungsten compact next is fired at an elevated temperature in an oven containing a vacuum or a reducing atmosphere, such as hydrogen. The environment within the oven should be oxygen-free so that oxidation of tungsten is prevented. It has been found that firing at a temperature of approximately 2350° C. for about twenty minutes produces a cathode of the necessary structural strength and a porosity of the order of 15 to 20 percent. The strength, as well as the porosity of the tungsten body is a function of both firing time and firing temperature; obviously, if the firing temperature is reduced, the firing time would have to be increased, and vice versa. As already mentioned, the tungsten compact will shrink to some extent as a result of this firing step.

The porosity of the tungsten compact partly determines the diffusion rate, that is, the rate at which the thorium diffuses out of the pores of the tungstne body onto the surface thereof. If the tungsten body is too porous, the thorium will escape too rapidly from the tungsten body and the cathode life obviously would be limited. Similarly, if the tungsten body is too dense, the thorium will not diffuse out to the surface rapidly enough to provide proper emission. Moreover, the porosity will determine the amount of thorium that can be made to penetrate initially into the tungsten body; the higher the porosity of the tungsten body the greater the initial supply of thorium which will be available in the tungsten body. For a given cathode operating temperature, an equilibrium condition is desired such that optimum coverage of the surface of the tungsten body is attained, since the surface coverage depends upon the amount of thorium which diffuses out of the tungsten pores onto the surface of the tungsten body. This optimum surface coverage is usually slightly less than a monomolecular layer of thorium. If the diffusion rate is lowered, because of decreased porosity of the tungsten body, it is necessary to resort to higher cathode operating temperatures to produce the same emission current density.

After firing the tungsten compact, it is usually necessary to allow the compact to cool while still in the oxygen-free environment of the oven to a temperature which permits the operator to handle the tungsten body which must next be coated with a thorium suspension. Moreover, the temperature should be below that at which oxidation of the tungsten can occur. Tungsten will oxidize at a relatively low temperature and such oxidation should be avoided in order to prevent subsequent formation of thoria when the tungsten body is impregnated with thorium.

Thorium powder suspended in a suitable binder, such as nitrocellulose, which evaporates during the firing process at a temperature well below the firing temperature, is applied to one or both surfaces of the tubular tungsten body 19, as by painting or spraying. The coated tungsten body 19 now is fired at a temperature exceeding the melting point of thorium in an oven containing a vacuum or an inert atmosphere such as helium or argon. As in the initial firing step, this firing should be accomplished in an oxygen-free environment to avoid oxidation of the thorium. If the thorium should become oxidized, undesirable thoria will be formed. Thoria, in addition to being a poorer emitter than thorium, is a hard substance which is very difficult to machine. In one instance, the thorium-coated tungsten body was fired at a temperature of above 2000° C. for about ten minutes. The firing time must not be too long or excessive thorium will evaporate out of the tungsten matrix during the firing process. During firing, the thorium melts and flows into the pores of the tungsten body by capillary action. As in the first firing step, it is advisable, while the tungsten body is in the oxygen-free environment, to bring the temperature of the impregnated tungsten body down to a temperature at which the cathode body can be readily handled for machining and down to a value below that at which oxidation of the tungsten and thorium occurs. The cathode body will have undergone further dimensional change during the second firing step which, however, is considerably less than that occurring during the first firing step.

The thorium-impregnated tungsten body is now held in position, as in a lathe, and machined to the proper size and shape by any well-known material-removing tools. Both the inside and outside surfaces of the cathode body normally will have to be machined. The inside surface must be machined in order to fit properly over the supporting member, while the outer surface must be machined in order to obtain the proper anode-cathode spacing. Since the thorium is substantially uniformly dispersed throughout the porous tungsten body, even machining may be attained over the entire cathode body.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A method of manufacture which comprises forming a porous member of tungsten of sufficient mechanical strength, applying thorium to the surface of said member, impregnating said porous member with thorium, and machining said impregnated member to the desired size and shape.

2. A method of manufacturing a cathode which comprises forming a porous member of tungsten of sufficient mechanical strength, applying thorium to the surface of said member, impregnating said porous member with thorium by heating said porous member to a temperature above the melting point of the thorium, and machining said impregnated member to the desired size and shape.

3. A method of manufacturing a cathode which comprises forming tungsten powder into a compact member, firing said member at an elevated temperature to form a porous member of sufficient mechanical strength, applying thorium to the surface of said member, impregnating said porous member with thorium by heating said porous member to a temperature above the melting point of the thorium, and machining said impregnated member to the desired size and shape.

4. A method of manufacturing a cathode which comprises forming tungsten powder into a compact member, firing said member at an elevated temperature to form a porous member of sufficient mechanical strength, cooling said member to a temperature below that at which oxidation of the tungsten occurs, applying thorium to the surface of said member, impregnating said porous member with thorium by heating said porous member to a temperature above the melting point of the thorium, cooling said impregnated member, and machining said impregnated member to the desired size and shape.

5. A method of fabricating impregnated cathodes which comprises compressing a mass of comminuted tungsten into a compact, firing said tungsten compact in an oxygen-free environment, applying thorium onto the surface of said tungsten compact, firing the thorium-coated tungsten compact in an oxygen-free environment until the tungsten compact becomes substantially uniformly impregnated with said thorium, and machining said thorium impregnated compact to the required size and shape.

6. A method of fabricating impregnated cathodes which comprises compressing a mass of comminuted tungsten into a compact, firing said tungsten compact in an oxygen-free environment, cooling said compact to a temperature below that at which oxidation of the tungsten occurs, applying thorium onto the surface of said tungsten compact, firing the thorium-coated tungsten compact in an oxygen-free environment until the tungsten compact becomes substantially uniformly impregnated with said thorium, cooling said impregnated compact to a temperature below that at which oxidation of the tungsten and thorium occurs, and at which physical handling of said impregnated compact becomes feasible, and machining said thorium impregnated compact to the required size and shape.

7. A method of fabricating impregnated cathodes which comprises compressing a mass of comminuted tungsten at a pressure of substantially fourteen tons per square inch into a compact, firing said tungsten compact at a temperature of about 2350° C. for about twenty minutes in an oxygen-free environment, cooling said compact to a temperature below that at which oxidation of the tungsten occurs, applying thorium onto the surface of said tungsten compact, firing the thorium-coated tungsten compact at a temperature of at least 2000° C. for about ten minutes in an oxygen-free environment until the tungsten compact becomes substantially uniformly impregnated with said thorium, cooling said impregnated compact to a temperature below that at which oxidation of the tungsten and thorium occurs and at which physical handling of said impregnated compact becomes feasible, and machining said thorium impregnated compact to the required size and shape.

References Cited in the file of this patent

UNITED STATES PATENTS

| | | |
|---|---|---|
| 2,721,372 | Levi | Oct. 25, 1955 |
| 2,830,218 | Beggs | Apr. 8, 1958 |
| 2,878,409 | Levi | Mar. 17, 1959 |